United States Patent [19]
Laudon

[11] Patent Number: 5,680,576
[45] Date of Patent: Oct. 21, 1997

[54] DIRECTORY-BASED COHERENCE PROTOCOL ALLOWING EFFICIENT DROPPING OF CLEAN-EXCLUSIVE DATA

[75] Inventor: James P. Laudon, Menlo Park, Calif.

[73] Assignee: Silicon Graphics, Inc., Mountain View, Calif.

[21] Appl. No.: 435,460

[22] Filed: May 5, 1995

[51] Int. Cl.⁶ ........................................ G06F 12/08
[52] U.S. Cl. .................. 395/472; 395/468; 395/451
[58] Field of Search ............................ 395/451, 468, 395/473, 472, 471

[56] References Cited

PUBLICATIONS

W.C. Yen et al., "Coherence Problem in a Multicache System," IEEE, pp. 332–339, 1982.
Mark S. Papamarcos et al., "A Low Overhead Coherence Solution for Multiprocessors with Private Cache Memories," Proc. of the 11th Annual Intl. Symp. on Computer Arch., pp. 348–354, Jun. 1984.
Daniel Lenoski et al., "The Directory–Based Cache Coherence Protocol for the DASH Multiprocessor," IEEE, pp. 148–159, 1990.
David Chaiken et al., "Limitless Directories: A Scalable Cache Coherence Scheme," ACM, pp. 224–234, 1991.
Daniel Lenoski et al., "The Stanford Dash Multiprocessor," IEEE, pp. 63–79, Mar. 1992.
Tony Brewer, "A Highly Scalable System Utilizing up to 128 PA–RISC Processors," IEEE, pp. 133–140, 1995.

Primary Examiner—Eddie P. Chan
Assistant Examiner—Kevin L. Ellis
Attorney, Agent, or Firm—Sterne, Kessler, Goldstein & Fox P.L.L.C.

[57] ABSTRACT

A multiprocessor system having a plurality of requestors, a memory and memory directory controller employing directory-based coherence. The system implements a method to detect dropping of clean-exclusive data. Only one intervention message is permitted to target an exclusive object held by a first requestor, wherein the intervention message is caused by a second requestor. The system detects whether the first requestor has an outstanding writeback for the object targeted by the intervention message, as well as whether the first requestor has a clean-exclusive, dirty-exclusive or invalid copy of the object targeted by the intervention message. A clean-exclusive copy of the object has been dropped when no outstanding writeback is detected and the first requestor has the object in the invalid state.

20 Claims, 9 Drawing Sheets

| STATE | POINTER |
|---|---|

DIRECTORY FORMAT

| Vld 1 | Address 36 | Exc 2 | Int 1 | Inv 1 | Resp 1 | Ack 1 | Hld 1 | WB 1 | Ack Cnt 9 | Interv.Message 72 |
|---|---|---|---|---|---|---|---|---|---|---|

| Vld 1 | Address 33 | Int 1 | WB 1 |
|---|---|---|---|

DIRECTORY-BASED COHERENCE PROTOCOL ALLOWING EFFICIENT DROPPING OF CLEAN-EXCLUSIVE DATA

CROSS-REFERENCE TO RELATED APPLICATIONS

The following are related, commonly owned, co-pending applications:

*System and Method for Multiprocessor Partitioning to Support High Availability,* U.S. patent application Ser. No. 08/435,462, filed May 5, 1995; and

*Cache Coherency Using Flexible Directory Bit Vectors,* U.S. patent application Ser. No. 08/435,463, filed May 5, 1995.

The disclosures of the above applications are incorporated herein by reference.

BACKGROUND OF THE INVENTION

1. Field of the Invention

The field of the invention relates to cache coherency, and more particularly, to a directory-based coherence protocol allowing efficient dropping of clean-exclusive data.

2. Related Art

Keeping coherent copies of cached information in a multiprocessing system is important for ease of use and high performance. Cached information can be memory data or virtual-to-physical address translations, or the like. Many protocols have been devised where coherence is maintained by broadcasting all operations to all caches. The caches then all broadcast their current state (often summarized on a few wires that AND or OR together the states of the caches) and each cache updates its own state based on its current state and the state of all other caches in the system. These broadcast protocols will be further referred to as "snoopy," since each cache must snoop on all the requests in the system. However, the scalability of such systems is limited by the large bandwidth required to view and potentially act on all these broadcast operations.

To solve the scalability problem, cache coherence based on directories is currently employed. The directory keeps information for each object, such as a cache line or a virtual-to-physical address translation, over which coherence is maintained. Each time a requestor wishes to access the object, it first interrogates the directory, which then determines which operations are necessary to maintain coherence on this object. The directory protocol strives to make this set of operations as minimal as possible to reduce the overhead on the system for maintaining coherence.

A feature of a previous variant of a snoopy protocol, known as either the Illinois or MESI protocol, was that it had extra support for the case where a processor was the first to ask for a read-only copy of the object or where it asked for a read-write copy and did not modify it. (See M. S. Papamarcos et al., "A Low Overhead Coherence Solution for Multiprocessors with Private Cache Memories," *Proc. of the 11th Annual Intl. Symposium on Computer Architecture,* pp. 348–354, June 1984.) These protocols distinguished between modified exclusive (hereafter referred to as dirty exclusive or DEX) and unmodified exclusive (hereafter referred to as clean exclusive or CEX). The performance advantage of supporting both a CEX and DEX state (instead of simply a DEX state) arose when the object needed to be replaced. When a DEX object is replaced, it needs to be written back to the main storage. However, when a CEX object is replaced, it does not need to be written back to the main storage, as the copy in the main storage is the same. Thus, replacing a CEX line causes no extra coherence messages for these protocols. This "silent" replacement of the CEX object is referred to as a CEX drop.

It would be desirable for good performance that a directory-based protocol support both the CEX and DEX states. However, supporting the CEX state without performance overhead is difficult for directory-based protocols. The difficulty arises because the processor can remove (or "drop") an CEX copy of an object from its cache without notifying the directory. When an CEX copy is dropped, the directory no longer has correct information on the state of that cache. Therefore, most prior directory-based protocols either (a) do not support the CEX state; or (b) support it by requiring the processor to send replacement hints each time it drops an CEX copy of an object from its cache. The problem with directory protocols supporting the CEX state using replacement hints is that the extra directory traffic due to replacement hints offsets the performance gain due to supporting the CEX state.

SUMMARY OF THE INVENTION

The invention is directed to a directory-based protocol that supports the CEX state, but does not require replacement hints. The protocol has the performance benefits of the CEX state without the costs of the extra directory traffic due to the replacement hints. The present invention does not rely on any network ordering to support dropping of clean-exclusive data.

The directory-based coherence according to the present invention can be used for a multiprocessor system having a plurality of requestors and a memory directory. The system implements a method to detect dropping of clean-exclusive data. Only one intervention message is permitted to target an exclusive object held by a first requestor, wherein the intervention message is caused by a second requestor. The system detects whether the first requestor has an outstanding writeback for the object targeted by the intervention message, as well as whether the first requestor has a clean-exclusive, dirty-exclusive or invalid copy of the object targeted by the intervention message. A clean-exclusive copy of the object has been dropped when no outstanding writeback is detected and the first requestor has the object in the invalid state.

In the preferred embodiment, all processor requests and writebacks are acknowledged (in prior art, generally only requests are acknowledged). An intervention to a cache that has a writeback pending can be detected by providing a writeback pending state in the cache protocol.

The protocol only allows a processor to have either a read request, a writeback request or neither a read request nor a writeback request outstanding. A processor cannot have both outstanding. One method for accomplishing this uses the writeback pending state in the cache.

The directory supports at least three coherence states: unowned (no cache copies of the object are in system), exclusive (one exclusive or modified copy is in the system), and busy (protocol is tracking down an exclusive copy to transfer ownership). The busy state allows only one requestor the opportunity to track down an exclusive or modified copy of a cache line. All other requestors are sent negative acknowledgements until the first requestor has completed its transaction. The busy state is not used by conventional coherency protocols.

The cache with the requested data responds to interventions with a revision message back to the directory (the revision message transitions the directory out of the busy state) in addition to whatever other actions the protocol takes. According to the preferred embodiment of the present invention, the revision message is a transfer message.

The cache also can transition into a state where it can hold an intervention while it has a request outstanding. According to the preferred embodiment of the present invention, this state is called the held intervention state.

Acknowledgements to writebacks come in two flavors, one for the case where the writeback encountered the directory in an exclusive state (called writeback exclusive acknowledge) and one where it encountered it in the busy state (writeback bust acknowledge). These two flavors are required to catch a race between a writeback and an intervention.

The directory can distinguish between requests from the previous owner of the cache line and all other requestors (i.e., the exclusive state has a pointer). This is required by the directory in order to be able to return data to a cache that has re-requested a dropped clean-exclusive cache line.

BRIEF DESCRIPTION OF THE FIGURES

The present invention will be described with reference to the accompanying drawings, FIGS. 1–8 represent conventional cache coherency techniques, and wherein:

FIG. 1 shows a state diagram for minimal conventional snoopy coherence protocol.

FIG. 2 shows a state diagram for a snoopy protocol supporting a clean exclusive (unmodified exclusive) state.

FIG. 3 shows state machines for a directory-based coherence protocol.

FIG. 4 shows a cache state diagram for a simple directory-based protocol that does not support the clean exclusive state.

FIG. 5 shows a state diagram for the directory protocol associated with the cache protocol of FIG. 4.

FIG. 6 shows the directory format to support the directory-based protocol of FIGS. 4–5, 7–8 and 10–13.

FIG. 7 shows a cache state diagram for a directory-based protocol which supports clean exclusive via replacement hints.

FIG. 8 shows a state diagram for the directory protocol associated with the cache protocol of FIG. 7.

FIG. 14 shows a data structure for a read request buffer, according to the present invention.

FIG. 15 shows a data structure for a write request buffer, according to the present invention.

The preferred embodiment of the invention is described below with reference to these figures where like reference numbers indicate identical or functionally similar elements.

Also in the figures, the left most digit of each reference number corresponds to the figure in which the reference number is first used.

DETAILED DESCRIPTION OF THE PREFERRED EMBODIMENTS

Figure 1:
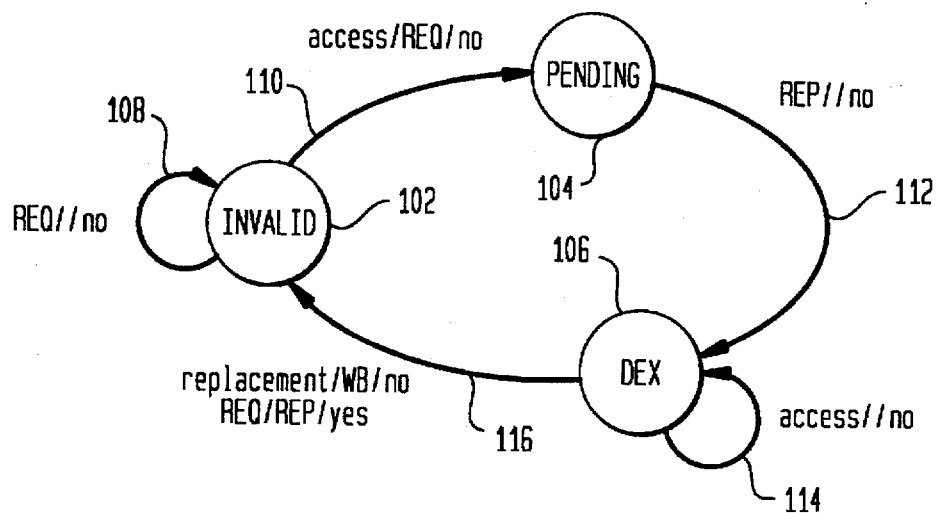

A minimal conventional snoopy coherence protocol in FIG. 1. This protocol only allows one cache to have a read-write copy of a cache line (for this example) at any given time. Support for read-only copies is left out of this discussion of conventional approaches and the below description of the present invention, but would be apparent to a person skilled in the relevant art.

A pending state is added for clarity to show that there is time between request (REQ) and reply (REP). Many snoopy protocols are designed such that no operation by another processor can occur while a processor is in the pending state (i.e., the transition from INVALID→PENDING→DEX looks atomic with regard to the protocol), and this is assumed here. The protocol requires the use of an override signal, which tells the main storage not to respond to a request since the cache will respond instead. Transition arcs are labeled in the form incoming operation/message sent on bus/override signals raised. The processor generates the following operation: access, replace. The bus has the following messages on it: request, reply, and writeback (WB). Processors only snoop on requests, and they ignore replies and writebacks on the bus. Note that the protocol is being observed by each cache in the system in parallel and in lockstep.

In this description the term "lockstep" means that each cache state machine is processing the same incoming message at the same time, such that this concurrent processing by cache state machines is essentially an atomic operation. In other words, it appears to other processes running on the system that the cache state machines all process messages at the same time.

A snoopy protocol is implemented by state machines, where each state machine is associated with a cache memory. Therefore, each of the cache state machines is processing the same messages at the same time in lockstep.

The simple snoopy protocol is shown in the state diagram of FIG. 1, which represents the state of a cache line in a particular cache memory. Three states are shown in FIG. 1: (1) an invalid state 102; (2) a pending state 104; and (3) a dirty exclusive (DEX) state 106. The invalid state 102 represents the condition in which this particular cache line is not present in this given cache. For example, either this cache line was not previously accessed or it had been earlier replaced. These states represent the state in the cache associated with a given line. The transition arcs (simply referred to as arcs) shown in the figure are the actions that the cache takes in response to incoming messages with respect to the given cache line.

The format for the information associated with each transition arc shown in FIG. 1 is as follows:

incoming operation/message to bus/override signal raised. Thus, the message to a bus and override signal raised, along with the given state transition, are the actions taken in response to the incoming operation. The incoming operations represent operations on the bus that reference this cache line. Thus, an arc 108 occurring during the invalid state 102 is labeled REQ/ /no. In this case, the incoming operation REQ is a request from another cache or requester (such as in input-output device, another memory directory in a distributed, shared memory system, or the like) for this given object (which is a cache line in this example, but could be a virtual-to-physical address translation, or the like). Because the state of this given cache line is invalid, the arc 108 simply returns to the invalid state. No message is sent and no override signal is raised by the cache.

The second operation that can occur during the invalid state 102 is represented by a transition arc 110. Arc 110 represents an access made by the processor associated with this cache. In this case, the processor has made an access to this given cache line. The processor places a request REQ on the bus to the memory controller. No override signal is raised. As a result, the cache line enters the pending state 104. The cache line leaves the pending state 104 when the cache receives a reply REP from the memory controller or from another cache in the system, as shown at an arc 112. The reply for arc 112 will come from a memory controller associated with memory where the memory block associated with that cache line is presently stored or from another cache, which may have the most recent copy of the cache line. In the simplest case for a non-distributed main memory, there is only one memory controller. Therefore this reply would be from that memory controller. Alternatively, the reply would be from whatever memory controller that is associated with that given address.

Upon receipt of the REP, the cache line enters the dirty exclusive DEX (also referred to as modified exclusive) state 106. While the cache line is in the DEX state 106, any access by its processor does not change the state of the cache line, as shown at an arc 114. The cache simply provides a copy of the cache fine to its processor.

Two further operations can occur to the DEX state 106. Both of these further operations cause the cache fine to transition to the invalid state, as shown at an arc 116. The first condition causing the transition back to the invalid state 102 from the DEX state 106 is if a replacement request is sent by the processor to replace the cache fine. A writeback (WB) message is sent to the memory controller associated with this address for updating the data. No override signal is raised. The replacement may be initiated by the processor because the processor has made a request to a different address that happens to map to the same address in this cache. In other words the processor wants to store a different fine at the location of this given line in the cache. The second case causing transition to the invalid state 102 is when another processor makes a request REQ to this cache line. Thus the cache sends a reply REP to the requesting processor along with the cache line, and raises the override signal (YES) indicating to main memory that this cache is servicing the request. This indicates to main memory it need not respond to the request.

Figure 2:
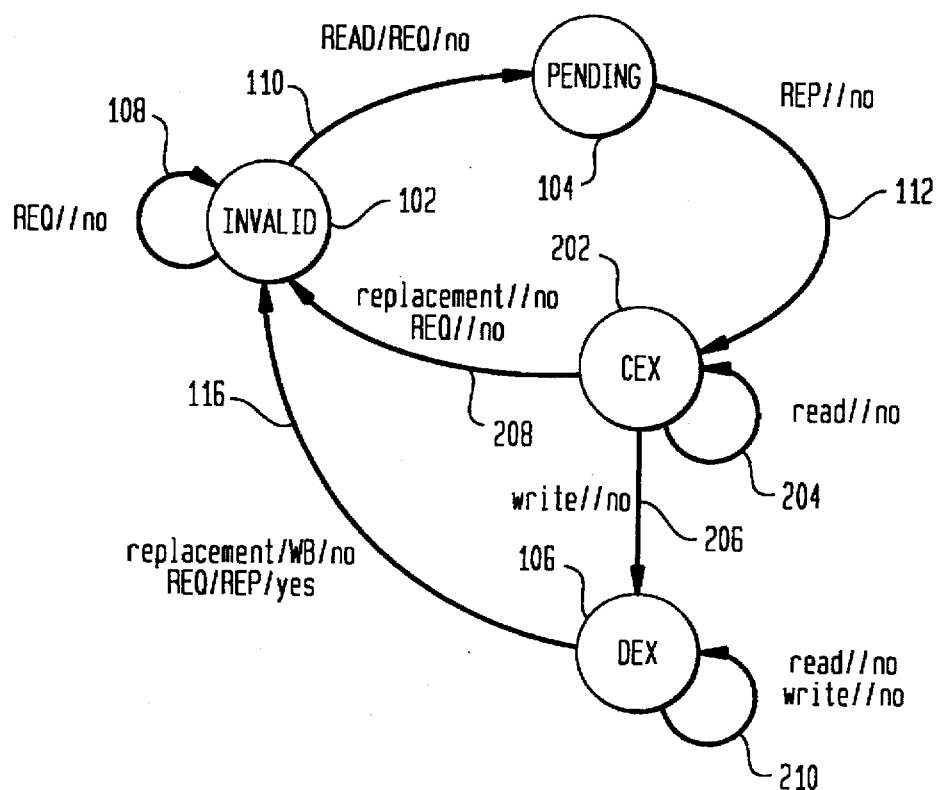

FIG. 2 shows a state diagram for a snoopy protocol supporting a clean exclusive (unmodified exclusive) state 102. This is a simplified version of the Illinois or MESI protocol (simplified in that read-only copies are not shown). The processor now can do both read or write accesses (to simplify the drawings, a write access to invalid is converted into two operations, a read access to fetch the object in a CEX state, and a write to move it to a DEX). In this example the states 102, 104 and 106, as well as the arcs 108, 112 and 116 follow the same protocol as described above in connection with FIG. 1.

In this case the notion of access has been broken down into two separate cases. The first involves access to read the data, and the second involves access to modify (i.e., write) the data. While in the invalid state 102, a read causes a transition to the pending state 104, as shown at an arc 212 (read/REQ/no), a request REQ is sent, and no override signal is raised.

In the clean exclusive CEX state 202, an incoming request to read the data does not change the state of the cache line, as shown at an arc 104. Alternatively, an incoming request to write the data transitions the state of the cache line from the CEX state 202 to the DEX state 106, as shown at an arc 206.

Two conditions in the CEX state 102 cause a transition to be invalid state 102. The first is if a replacement is requested. However, unlike the required writeback for a replacement as discussed in connection with FIG. 1, since this transition is from CEX state 202 to the invalid state 102, no writeback is requested because the data has not been modified. This transition is shown at an arc 208. This transition can also be caused by a request REQ from a another cache for the cache line. However, since the main memory has the same copy of the cache line, it is not necessary for this cache to provide a copy of the cache line.

Any read request or write request for the cache line when it is in the DEX state 106 will not cause a transition of the cache line state, as shown at an arc 210. Operations causing transitions from the dirty exclusive state 106 to the invalid state 102 shown at arc 116 are the same as described above in connection with FIG. 1.

Figure 3:
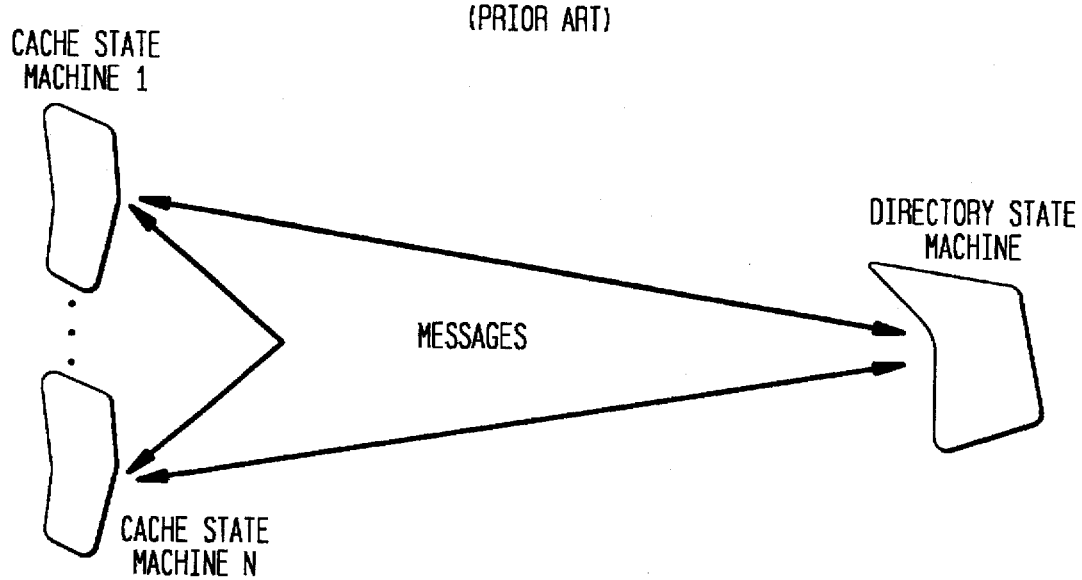

FIG. 3 shows how different state machines for a directory-based coherence protocol work. The directory protocol is distributed between a number of asynchronous state machines. Each state machine can be working on coherence for requests to different (or the same) objects. The state machines communicate by sending messages between them. In comparison, a snoopy protocol would not have the directory state machine, and the cache state machine would be forced to work in lockstep.

Figure 4:
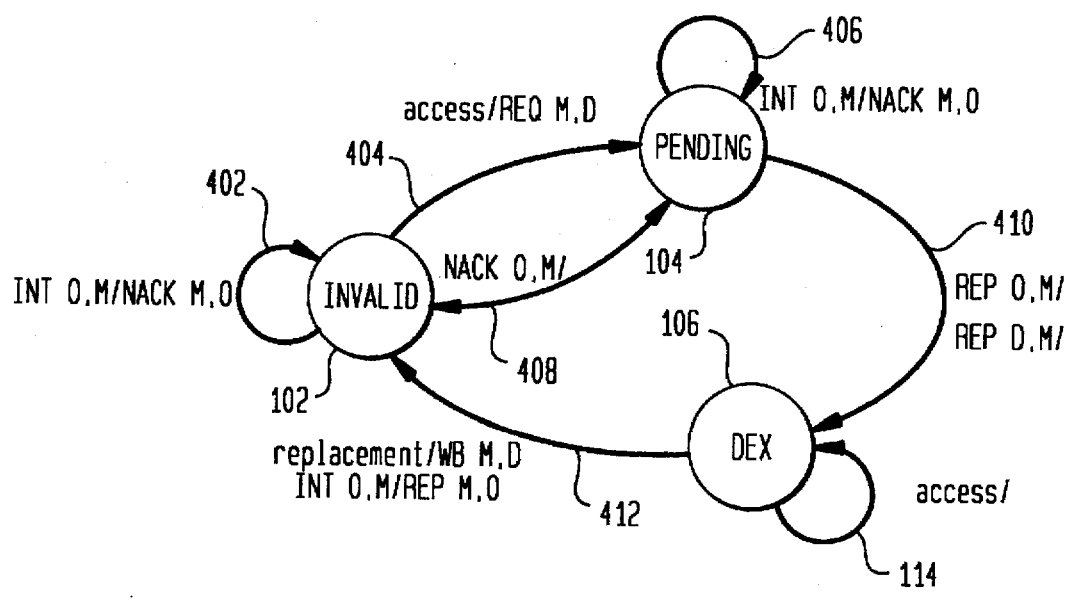

FIG. 4 shows the cache state transitions for a simple directory-based protocol that does not support the clean exclusive state. This protocol relies on the network providing point-to-point ordering. There are a few new message types: an intervention message (INT) is sent from the directory when it wishes to request that one cache transfer data to another and a negative acknowledgement (NACK) is sent when the protocol is unsuccessful in tracking down data to be transferred (due to temporary race conditions). Messages also contain a source and a destination since they are now point-to-point. Transition arcs are labeled in the form: incoming operation/message sent. The message format is: type, source, destination. The genetic source and destination identifiers are: D, M, and O are used. D(ir) is the id of the directory, M(e) is the id of the cache shown, O(ther) is the id of some other cache.

The three cache line states shown on FIG. 4 are the same states as discussed above in connection with FIG. 1 and 2. This example, however, rather than seeing a request from another processor, interventions are sent by the directories on the behalf of caches or other requesters. A directory will decide that a particular cache or processor is the owner of the desired data and the directory will make an intervention to the owner of the data on behalf of the requester. Interventions made by directories are coded to appear that they are from the requester of the data to the owner of the data (i.e., the source field on an intervention does not contain the directory id, but instead contains the requestor id.). This is done so the owner (e.g., a cache) of the data can respond directly to the requester.

At the invalid state 102 if an intervention (INT) from some other requester (O) to this cache (M) the message returned is a negative acknowledge (NACK) from M to O, as shown at an arc 402.

A transition from the invalid state 102 to the pending state 104 occurs when the processor makes a request or "access" to the cache for this given cache line, as shown at an arc 404. In response to this access, the cache state machine sends a request REQ to the directory (D) for the data. This request is made to the directory so that the directory can determine whether the memory can respond or whether the location of the data must be tracked down in another cache. During the pending state if an intervention is made by the directory on behalf of some other requester O to this cache M, a NACK signal is returned to the requester O, as shown at the arc 406.

This intervention to the pending state can be caused by race conditions in the protocol. This cache M does not yet have a copy of the requested data. If after the request is made to the directory (arc 404) and NACK is received from some other responder (e.g., requestor O), a transition from the pending state 104 to the invalid state 102 is caused, as shown at an arc 408. The requester must then repeat its request.

Two additional incoming operations can occur during the pending state 104 to cause a transition to the DEX state 106. The first is a reply REP from O to M with the requested data; the second is a reply PEP from the directory D to M with the data. The transitions at the dirty exclusive state 106 are similar to those discussed in connection with FIGS. 1 and 2, with only minor modifications. These differences are shown at an arc 412 that transitioning from the DEX state 106 to the invalid state 102. For this transition a replacement request from the processor will require a writeback (WB) from the cache M to the directory D. Alternatively, an intervention on behalf of another cache O (placed by the directory) to M will cause a reply message (REP) from M to O, as shown at an arc 410. Accesses made to the cache line during the DEX state 106 by the processor do not cause a transition, as shown at arc 114.

Figure 5:
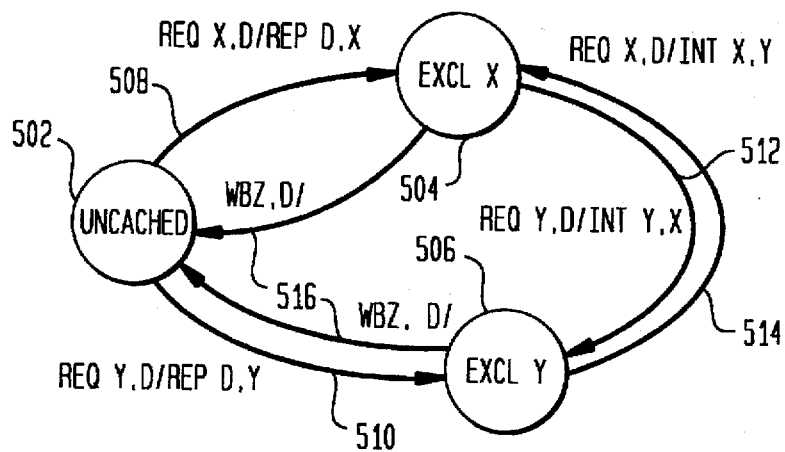

FIG. 5 shows state transitions for the directory protocol associated with FIG. 4. D(ir) is the id of the directory, X and Y are the ids of two different caches, and Z is the id of a cache that may be either X, Y, or a different cache. FIG. 5 includes three states: an uncached state 502; an exclusive X state 504; and, an exclusive Y state 506. The uncached state 502 indicates that the cache line of interest is not cached anywhere in the system. If a request is made from cache X, for example, to the directory D and the requested cache line is in the uncached state 502 a reply (REP) is sent by the directory D to the requesting cache X along with the data, as shown at an arc 508, and the directory transitions to the exclusive X state. This example shows a similar request made by a cache Y, and the reply by directory D to the cache Y is shown as a transition from the uncached state 502 to the exclusive Y state 506 via an arc 510.

Once in the exclusive X state 504, transition from exclusive X state 504 to exclusive Y state 506 is shown at an arc 512, upon a request by cache Y to the directory D for the cache line. In response to this request an intervention is made on behalf of Y by the directory D to cache X. Similarly, an arc 514 represents a transition from the exclusive Y state 506 to the exclusive X state 504. In this case the request is made by cache X to the directory for the cache line and an intervention on behalf of cache X is made by the directory and sent to cache Y.

When the cache line is in any exclusive state, such as exclusive X state 504 or exclusive Y state 506, the state transitions back to uncached if a writeback (WB) is requested, as shown at arc 516. Because of various races that can arise in the protocol, the cache that does the writeback may not necessarily be the cache that the directory thinks has an exclusive copy of the cache line. However, this is immaterial since the data is simply written to memory by the writeback and the state transition to the uncached state 502.

To describe the race conditions, consider for example a request from X soon followed by a writeback from Y, so that directory state transitions from exclusive Y to exclusive X. In this case, before an intervention can reach Y, cache Y has decided to writeback that line. So even though the state is in exclusive X, when the writeback comes from Y. The intervention from cache X will find the cache Y in the invalid state causing a negative acknowledgement (this NACK is shown in FIG. 4).

Figures 6, 8, 14, 15:
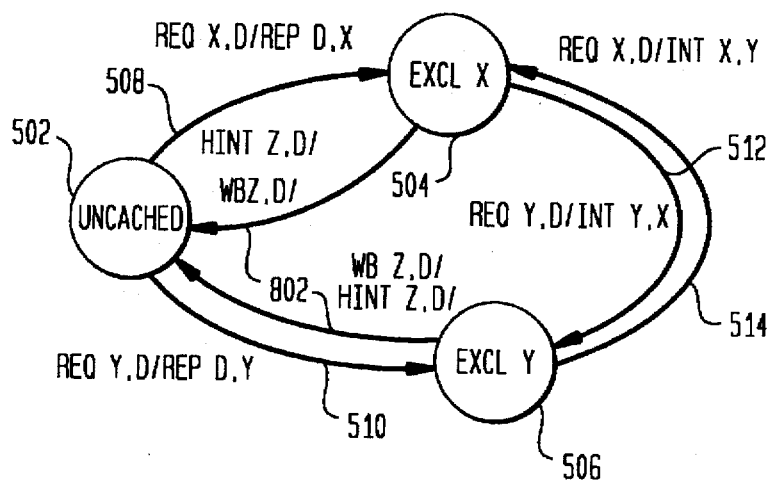

FIG. 6 shows the directory format required to support the directory-based protocol of FIGS. 4–5. The directory for protocols of FIGS. 4–5, 7–8 and 10–13 consists of at least one pointer (or some equivalent method of labeling a requestor) and some storage for the state.

Figure 7:
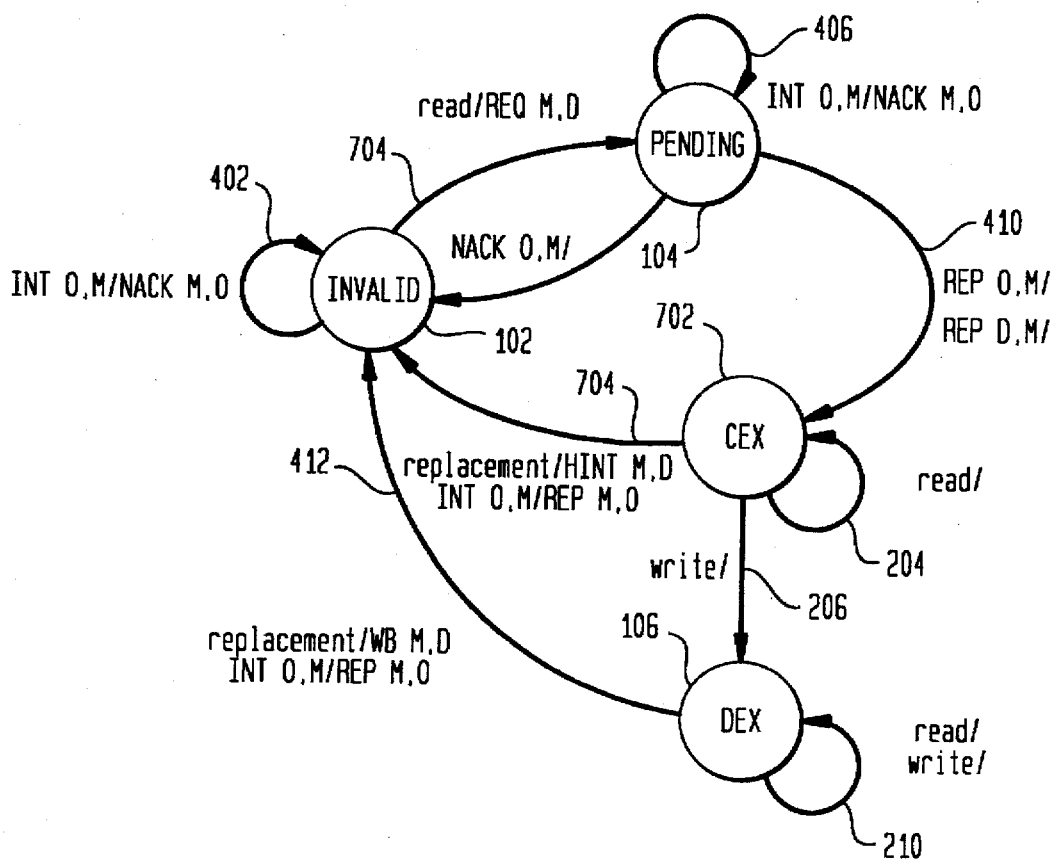

A directory-based protocol which supports clean exclusive via replacement hints is shown in FIG. 7 (for the caches) and FIG. 8 (for the directory). Like the previous directory protocol (FIGS. 5 & 6), this example also relies on point-to-point network ordering. Note that the replacement hint (HINT) requires a directory look-up, and it is this overhead (along with the extra messages) that the present invention protocol avoids.

The state diagram in FIG. 7 is similar to that shown in FIG. 4, with the exception that a clean exclusive (CEX) state 702 is added to the protocol. This example the invalid state 102, pending state 102 and dirty exclusive state 106 as well as the arcs 202, 206, 210, 402, 406, 410, and 412 all function as described above in connection with FIGS. 1, 2 and 4.

In this case, however, the arc 704 representing the transition from the invalid state 102 to the pending state 104 is a read, as described in connection with FIG. 2. Rather than the access being a read or write, in this protocol the transition from invalid is triggered by a read request rather than a write request. The request is from the cache M to the directory D. The reply to that read causes the transition from the pending state 104 to the CEX state 702. No transition from the clean exclusive state is initiated by a read as shown at the arc 204. However, a write request will transition the state from CEX to DEX, as shown at the arc 206.

As with an intervention in the DEX state 106, an intervention received by cache M while in the CEX state 702 initiates a transition into the invalid state after a reply is sent from the cache to the other cache O, as shown at transition arc 706. The transition from CEX state 702 to invalid state 102 may also be triggered by a replacement request by the processor. However, additional overhead is required in this protocol. This overhead is the requirement of a HINT from the cache M to the directory D.

The directory portion of the directory-based protocol with clean exclusive and the HINT is shown in FIG. 8. This state diagram for the directory is identical to that discussed above in connection with FIG. 5 except that the HINT is required together with a writeback transition to the uncached state 502, as shown at arc 802. The HINT, however, does not require the data to be sent to the directory D.

Directory-based Protocol with Clean Exclusive Dropping of Data

The inventors have reduced to practice a directory-based protocol that supports the clean exclusive state, but does not require replacement hints. The protocol has the performance benefits of the clean exclusive state without the costs of the extra directory traffic due to the replacement hints. Note that, unlike the previous examples of directory-based protocols, the protocol presented here does not rely on any network ordering.

The preferred protocol can support the exclusive state being dropped because of the following restrictions:

1. All processor requests and writebacks are acknowledged (in prior art, generally only requests are acknowledged).

2. An intervention to a cache that has a writeback pending can be detected by providing a writeback pending (WB PENDING) state in the cache protocol.

3. The protocol only allows a processor to have either a read request, a writeback request or neither a mad request nor a writeback request outstanding. A processor cannot have both outstanding. As will be shown below, one method for accomplishing this is to provide use the WB PENDING state in the cache.

4. The directory supports at least three coherence states: UNOWNED (no cache copies of the object are in system), EXCLUSIVE (one exclusive or modified copy is in the system), and BUSY (protocol is tracking down an exclusive copy to transfer ownership). The BUSY state allows only one requestor the opportunity to track down an exclusive or modified copy of a cache line. All other requestors are sent negative acknowledgements until the first requestor has completed its transaction. The BUSY state is not used by conventional coherency protocols.

5. The cache responds to interventions with a revision message back to the directory (the revision message transitions the directory out of the BUSY state) in addition to whatever other actions the protocol takes (according to the preferred protocol of the present invention, the revision message will is a transfer (XFER) message).

6. The cache contains a state where it can hold an intervention while it has a request outstanding (according to the preferred protocol of the present invention, this state is called HELDINT).

7. Acknowledgements to writebacks come in two flavors, one for the case where the WB encountered the directory in an exclusive state (WBEAK) and one where it encountered it in the busy state (WBBAK). These two flavors are required to catch a race between a WB and an intervention.

8. The directory can distinguish between requests from the previous owner of the cache line and all other requestors (i.e., the exclusive state has a pointer). This is required by the directory in order to be able to return data to a cache that has re-requested a dropped CEX.

With these restrictions, there is enough state in the caches to determine whether the owner dropped an exclusive copy of the object (e.g., cache line) when an intervention targets that cache. The following lists all the possible cases at the cache when an intervention arrives.

1. Reply on way to processor (intervention bypasses reply);

2. clean exclusive state has been dropped by processor, but re-request is on way to directory;

3. clean exclusive state has been dropped by the processor;

4. clean exclusive in the processor's cache;

5. dirty exclusive in the processor's cache;

6. writeback acknowledgement received by processor (writeback acknowledgement bypasses intervention);

7. writeback on the way to memory; and 8. writeback acknowledgement on way to processor.

Case 1 or case 2 is detected by being in the read-pending state when the intervention hits, and is handled by transitioning to the HELDINT state and storing the intervention. (The minimum information that needs to be stored is the address of the object and intervention type and data.) If a reply is received to the HELDINT state, case 1 occurred and the buffered intervention is given to the processor right after the reply. Otherwise a NACK will be received to the HELDINT state and case 2 really existed, and the processor is NACKed and then the intervention is sent to the processor. Case 3 is detected by the cache being in the invalid state. Cases 4 and 5 are handled by sending a reply to the requestor and a XFER message to the directory. Case 4 corresponds to cache state CEX and case 5 corresponds to the cache state DEX. Case 6 is detected by encountering the held writeback acknowledge (HELDWBBAK) state and the intervention is also dropped because the writeback generates a reply when it hits the directory. Cases 7 and 8 are detected by encountering the WB pending state and the intervention is dropped because the writeback generates a reply when it hits the directory. These cases are shown on the cache state diagram in FIG. 10.

Figure 10:
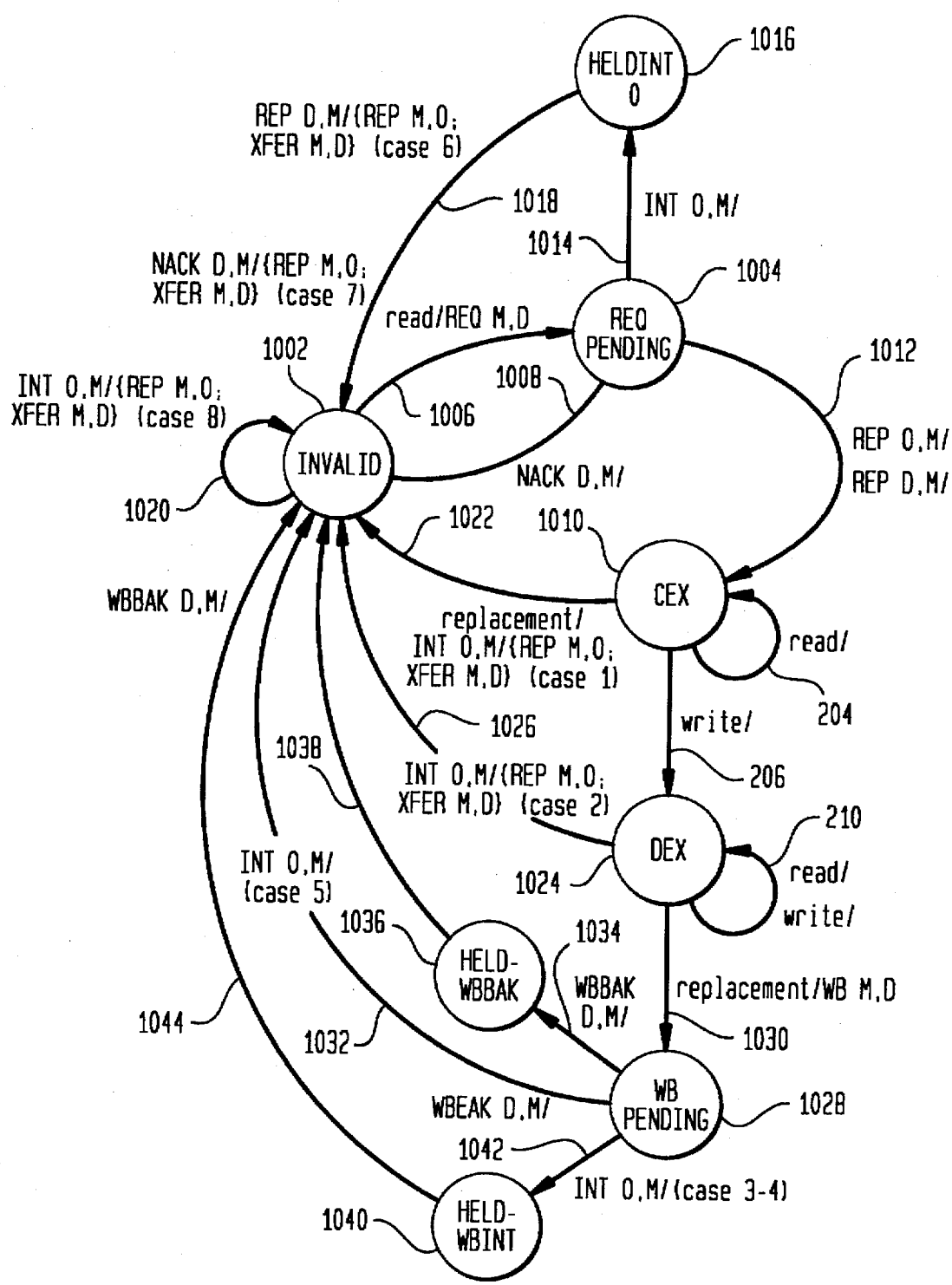
FIG. 10 shows a cache state diagram for a directory-based protocol that supports clean exclusive state without hints, according to the present invention.
Figure 11:
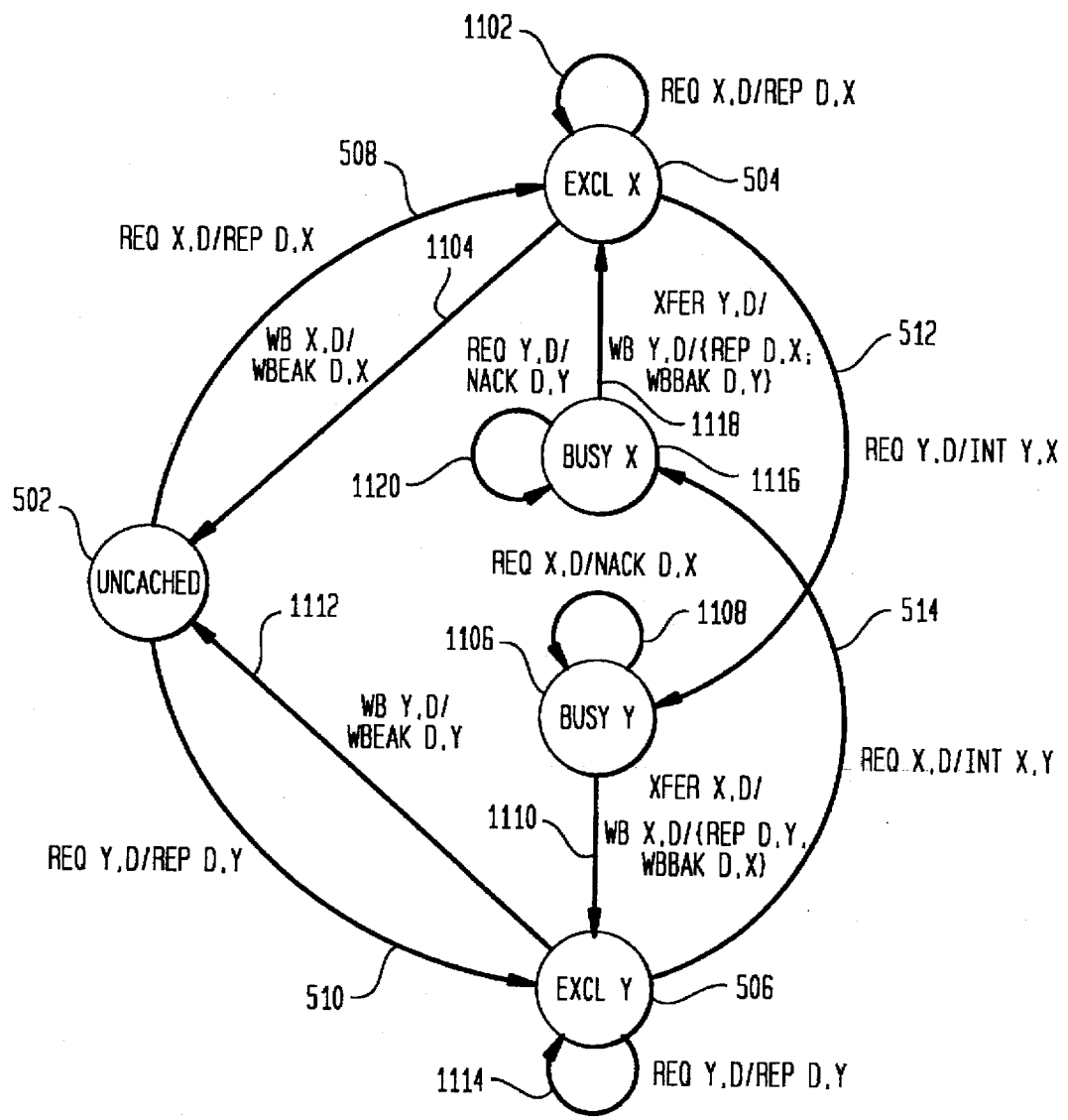
FIG. 11 shows state transitions for the directory protocol associated with the cache protocol of FIG. 10.

The preferred protocol according to the present invention is shown in FIG. 10 (for the cache) and FIG. 11 (for the directory). Arcs are again labeled by incoming message/ outgoing message(s). For the case where multiple outgoing messages are sent, the messages are enclosed in braces. For simplicity, requests that are NACKed go to the invalid state (where it is assumed the processor will repeat the request). Replies (REP) to the processor in a HELDINT state go directly to the invalid state, while in reality to guarantee forward progress, the transition would be to a CEX or DEX followed immediately by the issuing of an INT O, M to the cache.

The following messages are employed in the preferred embodiment of the coherence protocol: request (REQ), reply (REP), intervention (INT), writeback (WB), writeback exclusive ack (WBEAK), writeback busy ack (WBBAK), negative acknowledge (NACK), and transfer (XFER). The intervention differs from the intervention discussed above in that the intervention of the invention carries data with it in case the target of the intervention no longer has that data (i.e., the target has dropped its CEX data). There are two additional WB PENDING states, held writeback busy acknowledge (HELDWBBAK) and held writeback intervention (HELDWBINT). These states are required because the cache is waiting for both the WBBAK and INT messages before it considers the WB to be complete, and they can arrive in any order. The WB PENDING state will consider the WB to be complete if it receives a WBEAK (a WBEAK implies that the WB/intervention race did not occur).

Figure 9:
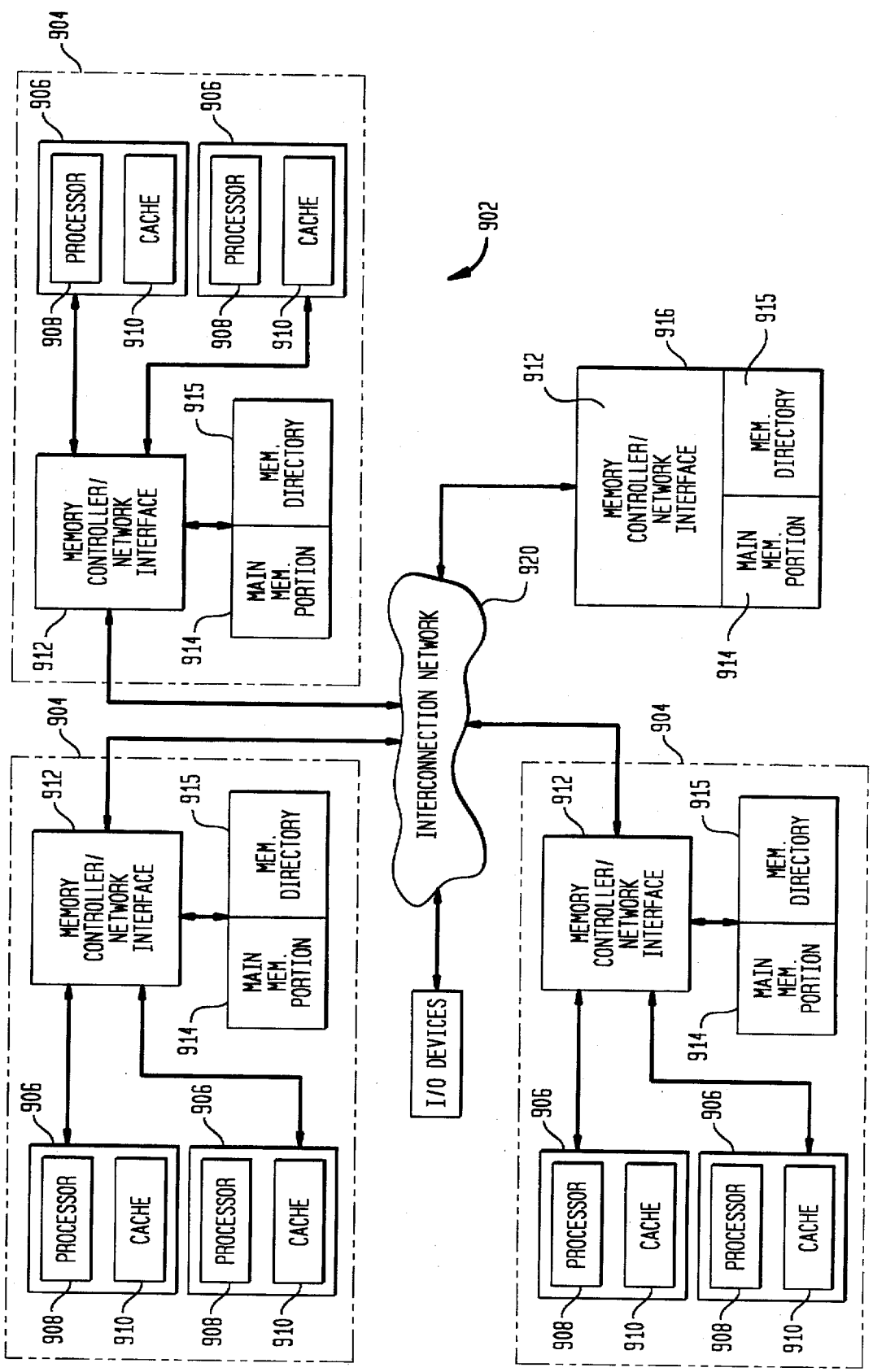
FIG. 9 is a block diagram of a distributed computer system according to a preferred embodiment of the present invention.

Before describing the cache and directory state diagrams, an exemplary block diagram of a distributed computer system 902 according to a preferred embodiment of the present invention will be described in connection with FIG. 9. The distributed computer system 902 is preferably a distributed, nonuniform memory access (NUMA) computer system. The computer system 902 includes a plurality of processing nodes 904 (preferably 512 processing nodes 904), which are physically distinct and physically separated from one another. The processing nodes 904 communicate with each other over a communication network 920, representing a well-known data communication means, such as a bus, local area network, multistage interconnection network, wide area network, etc., or any combination of these.

Each processing node 904 includes one or more computing nodes 906 (preferably, each processing node 904 includes two computing nodes 906). Each computing node 906 includes a processor 908 and a cache 910. Each processing node 904 also includes a memory controller and network interface 912. The processors 908 in any particular processing node 904 communicate with other devices connected to the communication network 920 via the memory controller and network interface 912 contained in that processing node 904. Each processing node 904 also includes a portion of main memory 914 and an associated memory directory 915. An additional main memory portion/memory controller and directory is shown at 916, and is directly coupled to the interconnection network 920. The portions of main memory 914 in all of the processing nodes 904 collectively represent the main memory of the computer system 902. Any processor 908 in any processing node 904 can access data stored in the portion of main memory 914 contained in any other processing node 904. Access to data contained in the portion of main memory 914 of any particular processing node 904 is controlled by the memory controller and network interface 912 contained in that same processing node 904, but is limited by the partitioning scheme disclosed in commonly-owned, copending U.S. patent application Ser. No. 08/435,462, filed May 5, 1995, titled, *System and Method for Multiprocessor Partitioning to Support High Availability*.

At any time, data elements stored in any main memory portion 914 can also be stored in any of the caches 910 existing in the processing nodes 904. Requests for data are make by requesters, such as a processor 908, I/O device 922, or the like. Each processing node 904 includes a directory-based cache coherency mechanism (not shown) to maintain the coherency of data stored in its main memory portion 914. The cache coherency mechanism preferably forms part of the memory controller and network interface 912 in the processing node 904. Directory information and state is stored in the memory directory 915. Similarly, partitioning information is also managed by the memory controller and network interface 912.

A preferred embodiment of the directory-based protocol implemented by the memory controller and network interface 912 is described in commonly-owned, copending U.S. patent application Ser. No. 08/435,463, filed May 5, 1995, titled, *Cache Coherency Using Flexible Directory Bit Vectors*.

The discussion of the cache portion of a directory-based protocol with clean exclusive dropping of data in accordance with the preferred embodiment present invention will start with an invalid state 1002. A read request from the processor to a cache M will cause a transition from the invalid state 1002 to a request pending state 1004. The cache controller for cache M will forward a request (REQ) to the directory D, as shown at an arc 1006. If a negative acknowledgement (NACK) is returned to cache M from the directory D, the state of the cache line will transition back to the invalid state 1002, as shown at an arc 1008.

One of two additional transitions from the pending state can occur. First, a transition from the request pending state 1004 to a CEX state 1010 can occur when a reply is sent to cache M from either some other (O) cache or from the directory (D), as shown at an arc 1012. Alternatively, the request pending state 1004 can be transitioned if an intervention (INT) from cache O to cache M actually bypassed the reply coming back to cache M. This intervention is shown at an arc 1014, and the state transitions into a new state called the held intervention (HELDINT) state 1016.

In accordance with the preferred embodiment the present invention, the system does not guarantee a network ordering of messages. In other words, the network does not act as a FIFO with a respect to messages such that network messages are not delivered in the same order that they were initiated. Regardless of when messages are inserted into the network, that does not guarantee that they are taken out of the network in the same order. Therefore, information concerning who made the intervention request must also be stored during HELDINT state 1016.

The state of the cache line can transition from the HELDINT state 1016 back to the invalid state 1002 in either of two cases. In a first case, if the intervention bypassed the reply (arc 1012) an incoming reply REP from the directory D to cache M is responded to with a reply (REP) from the cache M to cache O, for whom the directory made the initial reply. Additionally, a transfer (XFER) from cache M to the directory D is also made; this is labeled case 1 in FIG. 10. (The state of the directory at this stage will be described below in connection with FIG. 11.)

In the second case, if a clean exclusive copy of the cache line had been dropped, an intervention may beat the re-request of the data to the directory, and the directory generates a NACK to the cache M. Upon receipt of the NACK from the directory D, cache M replies (REP) to the cache O. A transfer message is then sent to the directory D from cache M prior to entering the invalid state 1002, as shown at an arc 1018.

If an intervention request is received at cache M from another cache (e.g., O) while the cache line is in the invalid state 1002, a reply (REP) is sent from cache M to that cache O, and a transfer message is sent to the directory D. This case (three) corresponds to the cache having dropped a clean exclusive copy of the data.

An intervention during the invalid state 1002 does not cause a state change as shown at an arc 1020. When an intervention is received, the cache controller must determine whether the cache line state is clean exclusive, dirty exclusive or whether it has dropped the clean exclusive copy of the cache line.

Turning again to the CEX state 1010, the read or write has the same effect as described above in connection with transition 204 and 206 of FIG. 7. In accordance with the present invention, dropping of clean exclusive data causes a transition from the CEX state 1010 to the invalid state 1002, as shown at transition arc 1022. The first transition out of the CEX state is at the request of a replacement made by the processor to cache M. A second message to cause a transition between CEX state 1010 and the invalid state 1002 is an intervention from some other cache (e.g., O) to cache M. This intervention generates a reply (REP) by cache M to cache O, and a transfer message by cache M to the directory D. This is a case in which the target is the clean exclusive copy, but it is still in cache M.

From the DEX state 1024 an incoming intervention message from cache O (for example) to cache M will cause transition to the invalid state 1002, via a transition arc 1026. This intervention is of the same form as the intervention discussed in connection with case 4 for a transition between state 1010 and state 1002. Any write or read requests while the cache line is in the DEX state 1024 will not cause a transition of the state, as shown at transition arc 210.

Receipt of a replacement request in the DEX state 1024 will cause a transition to a writeback pending (WB PENDING) state 1028, via a transition arc 1030. A writeback (WB) message is generated by the cache M and sent to the directory D. The WB PENDING state 1028 transitions to the invalid state 1002 if a writeback exclusive acknowledgement (WBEAK) is received, as shown at an arc 1032. In other words, after the writeback occurred, the directory sent back a message indicating that cache M was the exclusive owner of the cache line.

Alternatively, a writeback busy acknowledge signal (WBBAK) is sent to the cache M by the directory D on behalf of another cache (e.g., O), as shown at an arc 1034. Upon receipt of the WBBAK the cache line state transitions form the write-back pending state 228 to a held write-back acknowledge state 1036. The held write-back acknowledge state 1036 is entered if another cache locks up the directory prior to its receipt of the writeback message. After locking the directory and placing it in a busy state (as discussed below) the directory will send an intervention with message to transition the cache line from the held writeback acknowledge state 1036 to the invalid state 1002, as shown at a transition arc 1038.

A held writeback intervention state 1040 is transitioned into from the writeback pending state 1028 in the event that the writeback busy acknowledge and intervention messages (discussed in connection with the held writeback busy acknowledge state 1036) are received in reverse order. Thus, upon receipt of an intervention from some other cache O at cache M, the state transitions to the held writeback intervention (HELDWBBAK) state. A writeback busy acknowledge (WBBACK) signal is sent by the directory to cache M to transition to the invalid state 1002, as shown at in arc 1044.

The directory state diagram for directory-based protocol with clean exclusive dropping of data in connection with the present invention shows the case where two different requesters, X shown on the top of FIG. 11 and Y shown on the bottom. The three states including uncached state 502, exclusive X state 504 and exclusive Y state 506 as well as transition arcs 508, 510, 512, and 514 function as described above in connection with FIG. 5.

Beginning in state 502 (in which the line is uncached in a system), if a request is received from X to the directory, a reply is sent to the cache X and the state enters the exclusive X state 504. A transition arc 1102 back to the exclusive X state 504 handles the case in which that cache has dropped its clean exclusive copy of the data, so the directory replies with another copy of the data and the state does not change.

In the case where cache X writes back the data to directory D, a writeback exclusive acknowledgement (WBEAK) is sent by the directory to the cache X and the state returns to the uncached state 502, as shown at an arc 1104.

In the event that a request from a cache Y is sent to the directory D, the state transitions from exclusive X state 504 to a busy Y state 1106. After an intervention message is sent to cache X on behalf of cache Y by the directory D, as shown at the transition arc 512.

Any request from cache X to the directory while the cache line is in the busy Y state 1106 a NACK signal is sent by the directory to the cache X and no state transition occurs, as shown at a transition arc 1108. To illustrate the example, only a request from X is shown; however, this request could be from any other requestor in the system.

Transition from the busy Y state 1106 to the exclusive Y state 506 via a transition arc 1110 is initiated two ways. First, the transition can be initiated if a transfer message is sent by X to the directory D. This means that cache X responded to cache Y's request to update the directory and the data is transferred from cache X to cache Y. Additionally, a writeback from cache X to the directory has caused the directory to send a reply to cache Y and a writeback busy acknowledge (WBBAK) signal is sent from the directory to the cache X. Both of these messages in response to the writeback from cache X to the directory are shown in the braces adjacent arc 1110.

The transitioning via an arc 1112 from an exclusive Y state 506 to the uncached state 502 functions as described above in connection with transition arc 1104. Similarly, an arc 1114 functions similarly to the arc 1102 in the case covering no transition from exclusive Y state 506. Finally, a busy X state 1116, and transition arcs 1118 and 1120 function the same way as busy X state 1106 and transitions 1108 and 1110, respectively.

Figure 12:
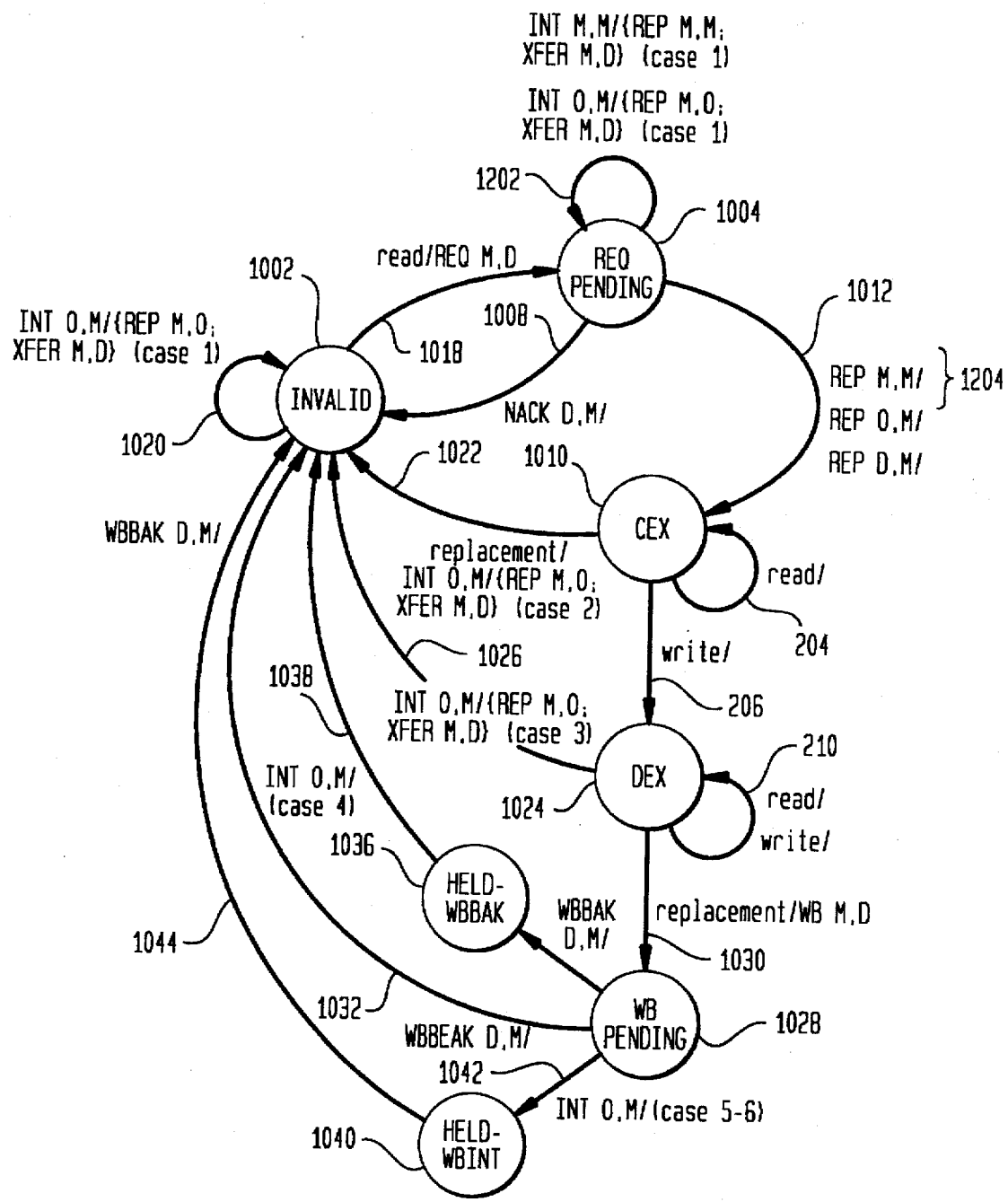
FIG. 12 shows another cache state diagram for a directory-based protocol that supports clean exclusive state without hints, according to the present invention.
Figure 13:
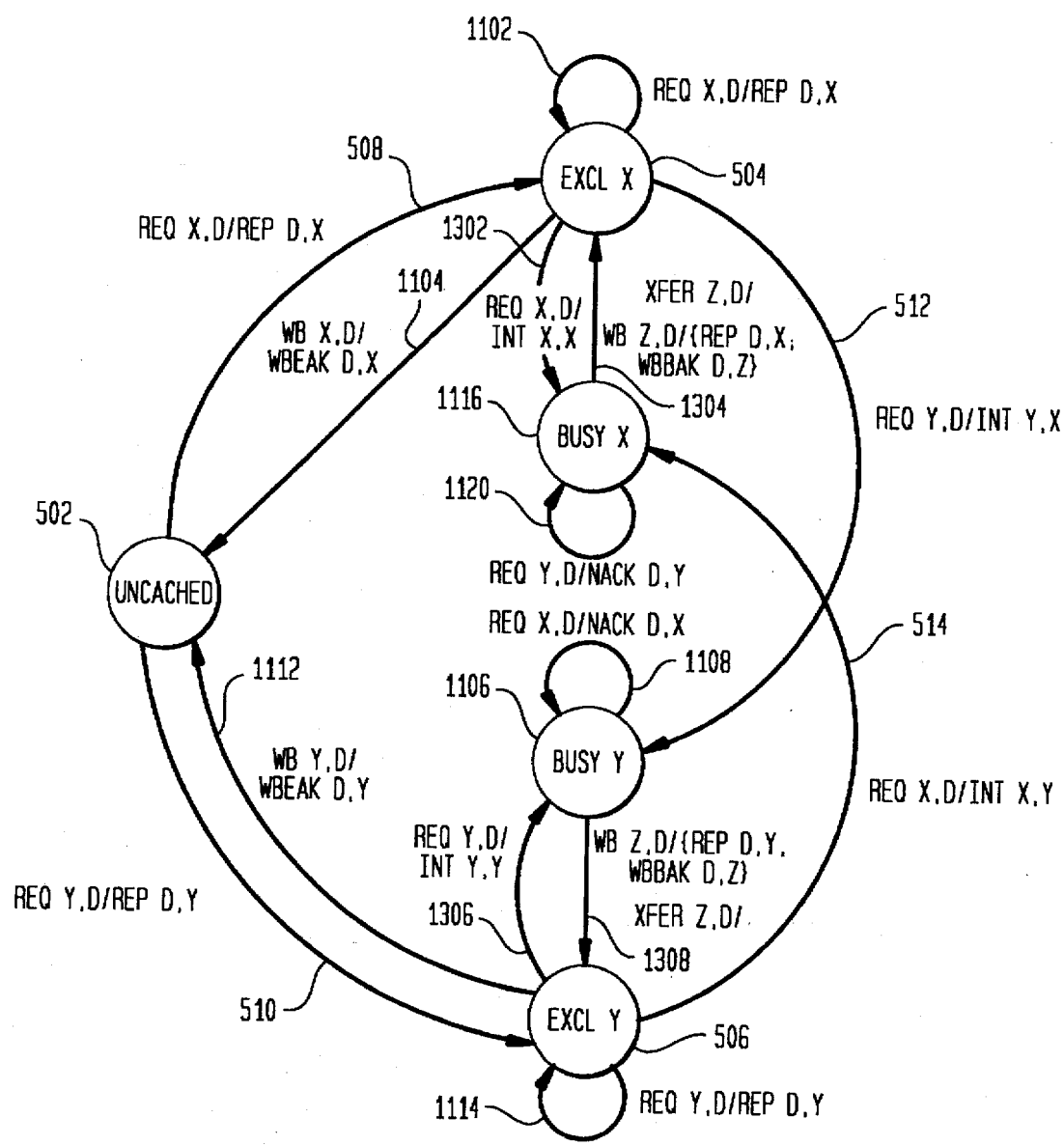
FIG. 13 shows state transitions for a directory protocol associated with the cache protocol of FIG. 12.

An alternative, somewhat simplified protocol to that described above in connection with FIGS. 10 and 11 is shown in FIGS. 12 and 13 for the cache and the directory, respectively. Many of the state and transition arcs in FIGS. 12 and 13 are identical to corresponding items in FIGS. 10 and 11, so a discussion of the common items will be omitted.

The alternative protocol can support the exclusive state being dropped because of the following restrictions (restrictions 3, 6 and 8 described above for the preferred embodiment are not supported by the alternative embodiment):

1. All processor requests and writebacks are acknowledged (in prior art, generally only requests are acknowledged).

2. An intervention to a cache that has a writeback pending can be detected by providing a writeback pending (WB PENDING) state in the cache protocol.

3. The directory supports at least three coherence states: UNOWNED (no cache copies of the object are in system), EXCLUSIVE (one exclusive or modified copy is in the system), and BUSY (protocol is tracking down an exclusive copy to transfer ownership). The BUSY state allows only one requestor the opportunity to track down an exclusive or modified copy of a cache line. All other requestors are sent negative acknowledgements until the first requestor has completed its transaction. The BUSY state is not used by conventional coherency protocols.

4. The cache responds to interventions with a revision message back to the directory (the revision message transitions the directory out of the BUSY state) in addition to whatever other actions the protocol takes (according to the preferred protocol of the present invention, the revision message is a transfer (XFER) message).

5. Acknowledgements to writebacks come in two flavors, one for the case where the WB encountered the directory in an exclusive state (WBEAK) and one where it encountered it in the busy state (WBBAK). These two flavors are required to catch a race between a WB and an intervention.

With these restrictions, there is enough state in the caches to determine whether the owner dropped an clean exclusive copy of the object (e.g., cache line) when an intervention targets that cache. The following lists all the possible cases at the cache when an intervention arrives:

1. clean exclusive state has been dropped by processor;

2. clean exclusive in the processor's cache;

3. dirty exclusive in the processor's cache;

4. writeback acknowledgement received by processor (writeback acknowledgement bypasses intervention);

5. writeback on the way to memory; and 6. writeback acknowledgement on way to processor.

Case 1 corresponds to the cache state INV or REQ pending. Case 2 corresponds to the cache state CEX, and case 3 corresponds to the cache DEX state. Cases 1 through 3 are handled by sending a reply to the other requestor and a transfer message to the directory. Case 4 is detected by encountering the HELDWBBAK state and the intervention is also dropped because the writeback generates a reply when it reached the directory. Cases 5 and 6 are detected by encountering the WB pending state and the intervention is dropped because the writeback generated a reply when it reaches the directory.

Without the HELDINT state 1016, interventions from either cache M or some other cache O do not change the state of the cache line. In response to an INT from M to M, M simply replies to itself and sends a transfer message to the directory D. Similarly, in response to an INT from O to M, M replies to O and sends a transfer message to the directory D. These two cases are shown generally at 1202. The reply from M to M, however, then causes the state to transition to the CEX state, as shown at 1204. The remaining state transitions and messages for this alternative protocol are the same as described above for FIG. 10.

The directory state diagram corresponding to the alternative protocol is shown in FIG. 13. This protocol differs from that in FIG. 10 in the transitions and messages between the BUSY X state 1116 and the EXCL X state 504, and the transitions and messages between the BUSY Y state 1106 and the EXCL Y state 506. A request from cache X it self to the directory D will cause a state transition to the BUSY X state 1116, as shown at a transition arc 1302. In response, cache X sends an intervention message to itself.

Upon encountering a transfer (XFER) message, from some other cache Z to the directory D, the cache line transitions from the BUSY X state to the EXCL X state, as shown at a transition arc 1304. The same state change occurs if a writeback (WB) is received from Z at D. In response to the WB, D sends a reply to cache X, and writeback busy acknowledge (WBBAK) message is sent to Z by D.

State transitions between the BUSY Y and EXCL Y states are shown at transition arcs 1306 and 1308. The messages passed between caches and the directory for transition arcs 1306 and 1308 are analogous to those described in the preceding paragraph for transition arcs 1304 and 1306, respectively.

Turning again to the preferred embodiment of the present invention, all processors track the status of their outstanding requests in a read request buffer (RRB; not shown) and their outstanding writebacks in a write request buffer (WRB; also not shown). The RRB and WRB can be implemented as a pair of content addressable controllers (CAMs). One CAM is to control outstanding requests and writebacks, respectively. The data (structure) field format for the RRB CAM and the WRB CAM are shown in FIGS. 14 and 15, respectively. The bit width of each field is represented by a number under a label for the corresponding field. Tables 1 and are the names and abbreviations for the fields of the RRB and WRB CAMs, respectively.

TABLE 1

| Field | Short Form | Size |
| --- | --- | --- |
| Valid | Vld | 1 |
| Address | Address | 36 |
| Exclusive | Exc | 2 |
| Intervention | Int | 1 |

TABLE 1-continued

| Field | Short Form | Size |
| --- | --- | --- |
| Invalidate | Inv | 1 |
| Response | Resp | 1 |
| Acknowledge | Ack | 1 |
| Held | Hld | 1 |
| Writeback | WB | 1 |
| Acknowledge Count | Ack Cnt | 9 |
| Intervening Message | Interv. Mes. | 72 |

TABLE 2

| Field | Short Form | Size |
| --- | --- | --- |
| Valid | Vld | 1 |
| Address | Address | 36 |
| Intervention | Int | 1 |
| Writeback | WB | 1 |

The information in Table 1 corresponds to a request pending state. The Vld bit indicates that this processor has a read outstanding, the address of which is stored by the address field. The exclusive is to track various types of reads, such as exclusive access, read-only copy, one which the requester intends not to cache the data, and the like.

An alternative to sending the data with the intervention is to have the directory return a speculative reply and forward the intervention with no data. When the intervention gets to the final destination and it turns out that cache has dropped a clean exclusive copy of the data, that cache can simply respond with a different type of message telling the original requester to use the speculative reply from memory. This saves having to send the data to the intervention target. If the intervention does find data, the intervention target return the data to the requestor and the original requestor ignores the speculative reply from memory. The response and acknowledge bits are used to track these possibilities.

The held bit is used to indicate that a read-only reply has been received, but all the invalidate acknowledge messages have not. The writeback bit is used to enforce the constraint of permitting a processor to have only one read request or writeback request at the same time. The acknowledge count field is used to track the number of invalid acknowledgements that are outstanding. When a reply is received from the directory that has a count of the number of expected invalidate Ack's. When an invalidate acknowledge is received, the count is decremented. 9 bits are used for the Ack Cnt supports 512 nodes in the multiprocessor system. The intervention message field is used to save the intervention message and data in the HELDINT state 1016.

The WRB fields track as follows. The Vld bit indicates that this processor has a writeback outstanding (e.g., the WB pending or held WB states), and its address is stored in the address field (since the WB is a full cache line in the preferred embodiment three low order bits need not be stored). The Int field is set to indicate the HELDWBINT state 1036, and the WB bit is set to indicate the HELDWB-BAL state 1040.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. In a multiprocessor system having a plurality of requestors, a memory and memory directory controller employing directory-based coherence, a method to detect dropping of clean-exclusive data comprising the steps of:

(1) permitting only one intervention message to target an exclusive object held by a first requestor, wherein said intervention message is caused by a second requestor;

(2) detecting whether the first requestor has an outstanding writeback for said exclusive object targeted by said intervention message;

(3) detecting whether the first requestor has a clean-exclusive, dirty-exclusive or invalid copy of said exclusive object targeted by said intervention message; and wherein it is detected that a clean-exclusive copy of said exclusive object has been dropped if no outstanding writeback was detected and the first requestor has said exclusive object in said invalid state.

2. The method according to claim 1, wherein prior to step 1, placing said exclusive object in a request pending state when a read request for said exclusive object occurs.

3. The method according to claim 2, further comprising the step of transitioning from said request pending state to a held intervention state if the intervention message occurs while said exclusive object is in said request pending state.

4. The method according to claim 2, further comprising the steps of:

transitioning from said request pending state to a held intervention state when the intervention message occurs; and transitioning from said held intervention state to said invalid state when a reply or a negative acknowledgement message occurs.

5. The method according to claim 1, wherein step 1 comprises the step of placing the directory for said exclusive object in a directory busy state to enforce said condition of only one intervention message.

6. The method according to claim 1, wherein step 2 further includes the step of having the memory reply to the second requestor when the memory receives said outstanding writeback.

7. The method according to claim 1, wherein step 2 comprises the step of placing said exclusive object in a writeback pending state.

8. The method according to claim 7, further comprising the steps of:

transitioning from said writeback pending state to a held writeback intervention state if the intervention message occurs while said exclusive object is in said writeback pending state; and transitioning from said held writeback intervention state when a writeback busy acknowledge message occurs.

9. The method according to claim 7, further comprising the steps of:

transitioning from said writeback pending state to a held writeback busy acknowledge state if a writeback busy acknowledge message occurs while said exclusive object is in said writeback pending state; and transitioning from said held writeback busy acknowledge state to said invalid state when the intervention messages occurs.

10. The method according to claim 7, further comprising the step of transitioning to said invalid state if a writeback exclusive acknowledge message occurs while said exclusive object is in said writeback pending state.

11. In a multiprocessor system having a memory for storing object data and employing directory-based coherence for the detection of dropping of clean-exclusive data, the system comprising:

a first requestor that holds an exclusive object, wherein said exclusive object can be in a plurality of states;

a second requestor for causing an intervention message to target said exclusive object held by a first requestor;

a memory directory for said exclusive object including first means for detecting whether said first requestor has an outstanding writeback for said exclusive object targeted by said intervention message; and second means for detecting whether said first requestor has a clean-exclusive, dirty-exclusive or invalid copy of said exclusive object targeted by said intervention message;

wherein it is detected that a clean-exclusive copy of said exclusive object has been dropped if no outstanding writeback was detected and the first requestor has said exclusive object in said invalid state.

12. The system according to claim 11, wherein said memory directory places said exclusive object in a request pending state when a read request for said exclusive object occurs from said first requestor.

13. The system according to claim 12, further comprising means, associated with one of said first requestor or said memory directory, for detecting whether said intervention message occurs while said exclusive object is in said request pending state, and transitioning the state of said exclusive object from said request pending state to a held intervention state.

14. The system according to claim 12, further comprising:

means for transitioning the state of said exclusive object from said request pending state to a held intervention state when the intervention message occurs; and means for transitioning the state of said exclusive object from said held intervention state to said invalid state when a reply or a negative acknowledgement message occurs.

15. The system according to claim 11, wherein the memory replies to the second requestor when the memory receives said outstanding writeback.

16. The system according to claim 11, further comprising means associated with said memory directory, for placing said directory in a memory directory busy state to thereby permit only one intervention message to target said exclusive object held by the first requestor.

17. The system according to claim 11, further comprising means, associated with one of said first requestor or said memory directory, for detecting a replacement message from said memory directory and placing said exclusive object in a writeback pending state.

18. The system according to claim 17, further comprising:

means for transitioning the state of said exclusive object from said writeback pending state to a held writeback intervention state if the intervention message occurs while said exclusive object is in said writeback pending state; and means for transitioning the state of said exclusive object from said held writeback intervention state when a writeback busy acknowledge message occurs.

19. The system according to claim 17, further comprising:

means for transitioning the state of said exclusive object from said writeback pending state to a held writeback busy acknowledge state if a writeback busy acknowledge message occurs while said exclusive object is in said writeback pending state; and means for transitioning the state of said exclusive object from said held writeback busy acknowledge state to said invalid state when the intervention messages occurs.

20. The system according to claim 17, further comprising means for transitioning the state of said exclusive object to said invalid state if a writeback exclusive acknowledge message occurs while said exclusive object is in said writeback pending state.

* * * * *